(12) United States Patent
Mulanon

(10) Patent No.: US 8,627,912 B2
(45) Date of Patent: Jan. 14, 2014

(54) BRACKET SET OF CNG FILLING RECEPTACLES FOR MOTOR VEHICLES

(75) Inventor: Kasap Mulanon, Nakhon Ratchasima (TH)

(73) Assignee: Surayut Posirisuk, Bangkok (TH)

( * ) Notice: Subject to any disclaimer, the term of this patent is extended or adjusted under 35 U.S.C. 154(b) by 0 days.

(21) Appl. No.: 13/392,325

(22) PCT Filed: Aug. 11, 2010

(86) PCT No.: PCT/TH2010/000031
§ 371 (c)(1),
(2), (4) Date: Feb. 24, 2012

(87) PCT Pub. No.: WO2011/056155
PCT Pub. Date: May 12, 2011

(65) Prior Publication Data
US 2012/0211488 A1    Aug. 23, 2012

(30) Foreign Application Priority Data

Nov. 5, 2009   (TH) .................................. 0901004946

(51) Int. Cl.
*B60K 15/01*    (2006.01)
(52) U.S. Cl.
USPC .......................... 180/69.4; 220/86.2; 141/331
(58) Field of Classification Search
USPC ....................... 180/69.4, 69.5; 220/86.1, 86.2; 141/331, 333
See application file for complete search history.

(56) References Cited

U.S. PATENT DOCUMENTS

| 4,573,694 A | * | 3/1986 | Goto et al. | 280/834 |
| 6,976,513 B2 | * | 12/2005 | Schlachter | 141/88 |
| 7,000,950 B2 | * | 2/2006 | Neely et al. | 280/834 |
| 7,422,242 B2 | * | 9/2008 | Matsumoto et al. | 280/834 |

FOREIGN PATENT DOCUMENTS

| DE | 3209007 | | 8/1983 | |
| DE | 202010005071 | | 7/2010 | |
| EP | 1449702 | | 8/2004 | |
| EP | 1852298 | A1 * | 11/2007 | |
| FR | 2745531 | | 9/1997 | |
| JP | 08164757 | A * | 6/1996 | B60K 15/04 |

OTHER PUBLICATIONS

International Search Report and Preliminary Report on Patentability for International Application No. PCT/TH2010/000031.

* cited by examiner

*Primary Examiner* — John Walters
(74) *Attorney, Agent, or Firm* — Warner Norcross & Judd LLP

(57) ABSTRACT

A CNG filling receptacle holding device for a vehicle according to the present invention comprises additional elements for the installation of CNG filling receptacle with the fuel filling path opening on the body of the vehicle to that of the typical installation of the gas filling receptacle inside the engine compartment wherein a number of molded plates are made into elements for assembling onto a frame at the position of the CNG filling receptacle holding device for the vehicle according to the present invention.

2 Claims, 3 Drawing Sheets

US 8,627,912 B2

BRACKET SET OF CNG FILLING RECEPTACLES FOR MOTOR VEHICLES

1. FIELD OF THE INVENTION

The invention is in the field of Engineering relating to a CNG filling receptacle holding device for a vehicle.

2. BACKGROUND OF THE INVENTION

In order to develop and design the equipment used in a CNG system to meet the system requirements, generally the arrangement of the pipes and the position of the CNG filling receptacle in the vehicle with the CNG system often are located in the engine compartment. In other words, the locations of the filling receptacle for gasoline and that for CNG are separated apart from one another. As a result, this makes it inconvenient for a motorist to locate the parking spot to have either type of the fuels filled in. In this respect, a concept to relocate the CNG filling receptacle in the engine compartment to be installed together with the gasoline filling opening on the side of the car body is initiated. With such concept, it will make the fuels filling experience more convenient.

3. SUMMARY AND OBJECTS OF THE INVENTION

The CNG filling receptacle holding device according to the present invention is characterized in that a frame unit comprises a cover of CNG filling receptacle whereas the cover is placed upon a the upper gas filling receptacle holding bracket and the lower gas filling receptacle holding bracket to cover the gas filling receptacle and the gasoline filling receptacle. The two brackets are used to hold the CNG filling receptacle. The two brackets are fixed on their sides to a frame bracket in the middle of the frame unit and located and installed below the frame bracket is a bracket locking frame whereas the frame bracket and the bracket locking frame connected to one another make a groove in the middle line to accommodate the fuel pipes extending along the line within the groove. The assembly of the frame bracket and the bracket locking frame is served as a leg to hold the CNG filling receptacle on the top and as well as a track to cover the fuel pipe below. On the upper part of the frame bracket, there is provided a bracket covering the fuel pipe. At the later stage, the bracket locking frame is assembled with the vehicle frame by means of the attachment of the frame locking plate and the frame fastening sleeve with the frame using screws and nuts as a fixing element for the leg unit to hold the CNG filling receptacle with the vehicle frame whereas the frame fastening sleeve is also used to lock the frame.

The object of the present invention is to lessen the difficulties for the motorist whose vehicle is equipped with both CNG and conventional fuel systems in that the conventional filling of CNG is required to perform at the front of the engine compartment meaning that it is required to open up the hood prior to filling the gas. However, the present invention will help the filling of the fuels more convenient and faster because the CNG filling receptacle is installed together with the fuel filling pipe on the side of the vehicle.

4. DETAILED DESCRIPTION OF THE PREFERRED EMBODIMENTS

A CNG filling receptacle holding device for a vehicle according to the present invention comprises additional elements for the installation of CNG filling receptacle with the fuel filling path opening on the body of the vehicle to that of the typical installation of the gas filling receptacle inside the engine compartment wherein a number of molded plates are made into elements for assembling onto a frame at the position of the CNG filling receptacle holding device for the vehicle according to the present invention. These elements are joined together between the frame of the vehicle and the CGN filling receptacle. That is there are provided a upper gas filling receptacle holding bracket and a lower gas filling receptacle holding bracket that are superimposed to one another on the top of the frame unit. Also, there are provided holes for assembling the CNG filling receptacle with the frame bracket that acts as an interconnector on the frame unit. In addition, the fuel pipe covering bracket is joined at the top thereof; while the frame locking bracket as a base of the frame unit is joined with the outside frame of the vehicle on the bottom, and aligned with the transverse frame of the vehicle whereas a frame locking bracket is joined inside the vehicle frame at the front of the transverse frame of the vehicle and another frame locking bracket at the back of the transverse frame, and two frame fastening brackets are interposed on the top of the vehicle frame and another two fastening brackets on the back of the vehicle frame. The CNG filling receptacle holding device for the vehicle according to the present invention is tightened with bolts that go into the frame locking bracket, the frame fastening sleeve holes and the frame locking plate. The device is then tightened with nuts to fix the CNG filling receptacle holding device for the vehicle according to the present invention to the vehicle frame. The gas filling receptacle and the fuel filling receptacle have a cover thereon whereas the cover is joined with the vehicle body to prevent the CNG filling receptacle holding device for the vehicle according to the present invention from being seen from the outside.

According to FIG. 1, it illustrates the frame of the vehicle part of which the CNG filling receptacle holding device is installed for the vehicle. According to the present invention, it comprises a side frame 1 and a transverse frame 2 wherein the CNG filling receptacle holding device for the vehicle according to the present invention is installed on the outside of the side frame and next to the transverse frame 2 installed inside the said side frame 1.

According to FIG. 2, it illustrates the first stage of the parts assembling of the CNG filling receptacle holding device for the vehicle. According to the present invention, it comprises a frame bracket 5 as a main frame characterized in that it is a upward folding plate in a U shaped wing, the upper part of which has a lower gas filling receptacle holding bracket 4 and a upper gas filling receptacle holding bracket 3 connected by the means of attachment. The lower gas filling receptacle holding bracket 4 and the upper gas filling receptacle holding bracket 3 have flanges stacked to one another. On the flange, there is provided a number of holes for assembling the gas filling receptacle 7 (not shown in the figure) into the holes. On the flange of the frame bracket 5, there are provided two holes on each side in which the bolts 30 are used to fix the parts between the bracket 5 and the fuel pipe covering bracket 10 (not shown in the figure). At the lower middle line, there are provided two bolt-through holes 30 wherein the two holes are fixed with spot nuts 20 at both hole openings. Bolts 30 are used to inserted into the said holes to fix the parts between the frame bracket 5 and frame locking bracket 6 (not shown in the figure) together.

According to FIG. 3, it illustrates the second stage of the parts assembling of the CNG filling receptacle holding device for the vehicle according to the present invention comprises the gas filling receptacle 7 and the frame locking bracket 6 wherein when the frame bracket 5 and the lower gas filling receptacle fixing bracket 4 and the upper gas filling receptacle fixing bracket 3 are assembled into one unit as in FIG. 2, the gas filling receptacle 7 is put and assembled in the through holes on the top of the upper gas filling receptacle fixing bracket 3 and the lower gas filling receptacle fixing bracket 4. The gas filling receptacle 6 is then locked together to the flange by means of attachment. Later, the lower part of the frame bracket 5 is assembled with the frame locking bracket 6 using two bolts 30 to lock and fix the spot nut 20 at the frame bracket 5. Then the unit is assembled and fixed together between the frame bracket 5 and the frame locking bracket 6. The frame locking bracket 6 is characterized in that it is a plate molded into a shape with a deep groove in the middle to accommodate the shape of the frame bracket 5 when assembling and is served as a reinforcing element of the work piece. On the middle groove, there is provided a big holes as a channel which the fuel pipe goes through (not shown in the figure). Both wings of the frame locking bracket 6 are molded into a bulging shape on both sides whereas the bulging area is a flange to be assembled with the side frame of the vehicle 1 (not shown in the figure). On the corners of the both wings, there are provided four bolt-through holes at all four corners for locking the frame bracket to the side frame of the vehicle 1 (not shown in the figure) using the bolts 30.

According to FIG. 4., it illustrates that the assembling of the CNG filling receptacle holding device for the vehicle according to the present invention with the frame wherein the frame bracket 5 fixed with the upper gas filling receptacle holding bracket 3, the lower gas filling receptacle holding bracket 4, the gas filling receptacle 7 and the frame locking bracket 7 are assembled by means of fixing in such a way that the both sides of the flange of the frame locking bracket 6 is fixed with the outside of the side frame of the vehicle 1. At the same time, the middle groove line of the frame bracket 5 and the frame locking bracket 6 is placed below the fuel pipe unit 12. Four locking bolts 31 are put through the four through holes of the frame locking brackets 6. The frame fastening sleeve 8 is then assembled with the locking bolts 31 whereas the said frame fastening sleeve 8 is served as a fastener for the side frame of the vehicle 1 on the upper and lower parts. Then the frame locking plate 9 having two through holes with spot nuts fixed at the mouths of both through holes is assembled with the frame fastening sleeve 8 inside the side frame of the vehicle 1 whereas the position of each of the frame locking plates 9 is placed at the front and the back of the transverse frame of the vehicle 2 individually. Then the locking bolts 31 are tightened through the frame locking bracket holes 6. The frame fastening sleeve 8 and the frame locking plate 9 are tightened with the four spot nuts 21. The fuel pipe covering bracket 10 with bolt through holes 30 at all four corners thereof and four of the spot nuts 21 fixed at all four corresponding bolt through holes 30 are inserted between the pipe line of the fuel pipe unit 12 whereas the fuel pipe covering bracket 10 covers only the main pipe of the fuel pipe unit 12 (not shown in the figure), then is assembled with the frame bracket 5 in a manner that the position of all four bolt through holes 30 of the frame bracket 5 and the fuel pipe covering bracket 10 are aligned to one another. The said locking frame brackets are locked using the bolts 30 inserted into the through holes of the frame bracket 5 and the fuel pipe covering bracket 10. The bolts are tightened with the four spot nuts 21 fixed to the fuel pipe covering bracket 10. Then the gas filling receptacle 11 is put into place whereas the through holes of the gas filling receptacle 7 and that of fuel pipe unit 12 are fit onto the gas filling receptacle 7 and the fuel filling pipe receptacle unit 12. The gas filling receptacle cover 11 is locked in such as way that the flange of the cover is fixed to the edge of the fuel filling opening on the side of the body (not shown in the figure). The said gas filling receptacle cover 11 is assembled separately from the CNG filling receptacle holding device for the vehicle according to the present invention, rather it is tightly fixed to the edge of the fuel filling opening on the side of the body (not shown in the figure) using four screws (not shown in the figure).

According to FIG. 5, it illustrates the complete CNG filling receptacle holding device for the vehicle according to the invention that is installed on the side frame of the vehicle 1, the fuel pipe unit 12, and the gas filling receptacle 7 according to the present invention.

5. BRIEF DESCRIPTION OF THE DRAWINGS

6. THE BEST MODE OF THE INVENTION

Figure 1:
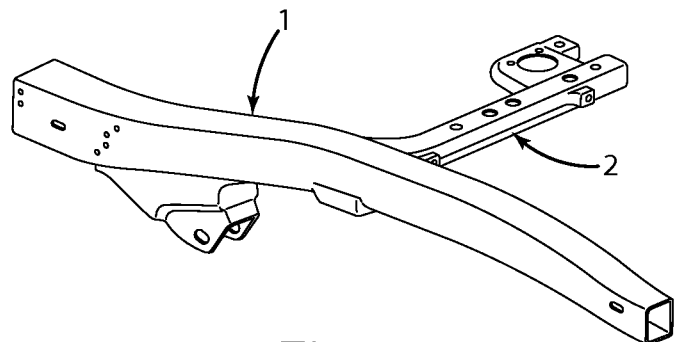
FIG. 1 illustrates a vehicle frame unit with the installment location of the CNG filling receptacle holding device for a vehicle according to the present invention.
Figure 2:
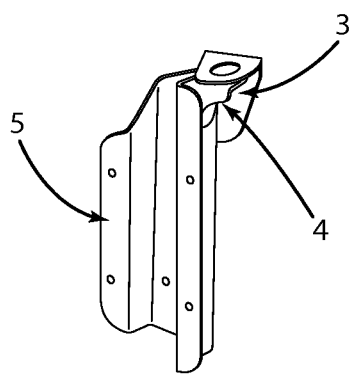
FIG. 2 illustrates the first step assembling of the CNG filling receptacle holding device for a vehicle according to the present invention.
Figure 3:
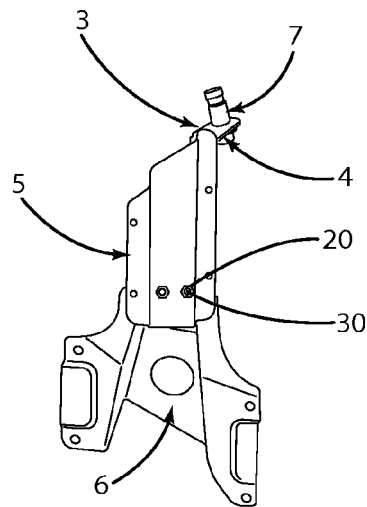
FIG. 3 illustrates the second step assembling of the CNG filling receptacle holding device for a vehicle according to the present invention.
Figure 4:
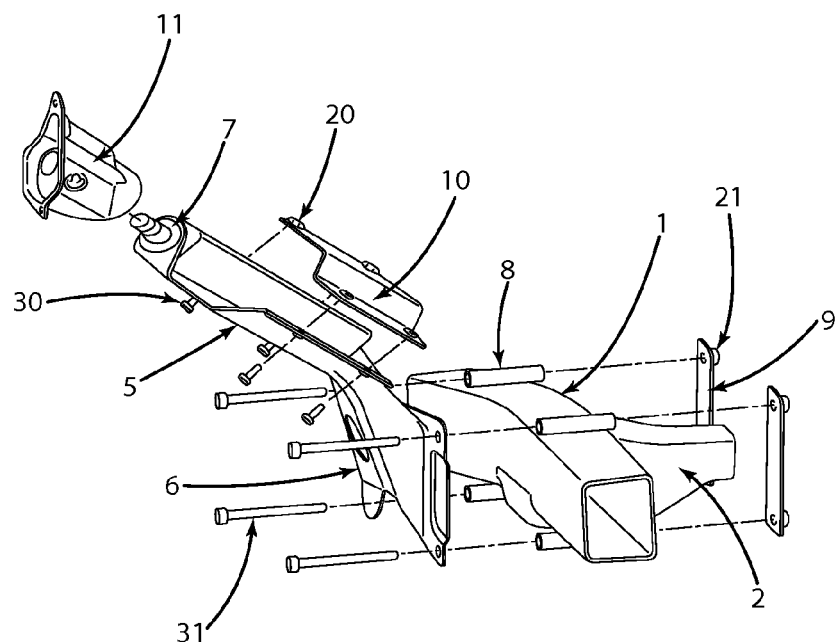
FIG. 4 illustrates the assembly of the CNG filling receptacle holding device for a vehicle according to the present invention.
Figure 5:
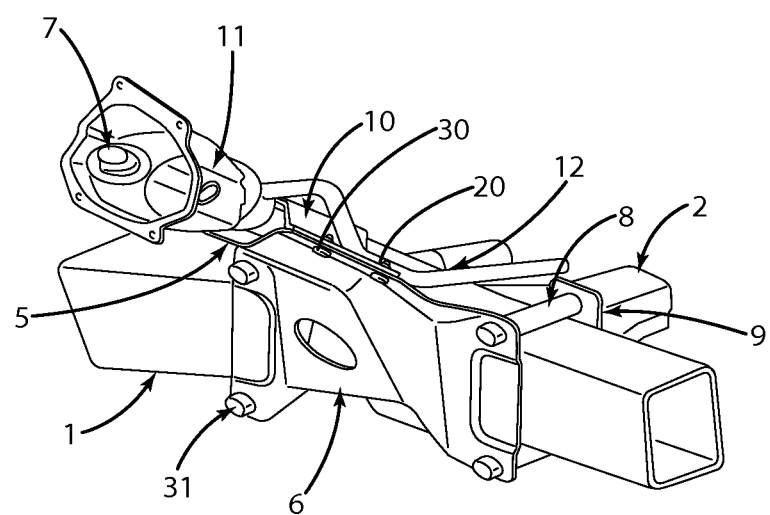
FIG. 5 illustrates the installation of the complete CNG filling receptacle holding device for a vehicle according to the present invention.

As same as aforementioned in the Detailed Description of the Preferred Embodiments topic.

The invention claimed is:

1. A CNG filling receptacle holding device for a vehicle comprising:
   a gas filling receptacle installed on an upper gas filling receptacle holding bracket and a lower gas filling receptacle holding bracket, wherein said upper gas filling receptacle holding bracket and said lower gas filling receptacle bracket are molded plates joined and superimposed to one another forming part of a frame bracket;
   wherein a gas filling receptacle installation side of said frame bracket includes holes for mounting said gas filling receptacle;
   wherein said frame bracket is adapted to mount to a side of the gas filling receptacle;
   wherein said frame bracket is molded to form a U shaped wing and connected to a frame locking bracket, wherein said frame locking bracket is molded to form a shape with a groove in the middle and has a protruding flange on both sides to couple with a side frame of a vehicle, wherein a middle line of the frame bracket and the frame locking bracket is under a fuel pipe unit;
   wherein an upper part of the frame bracket is joined to a fuel pipe covering bracket that covers the fuel pipe unit;
   wherein a part of the frame bracket other than the upper part joins to an outside of the side frame of the vehicle;
   first and second locking plates disposed on an inside of the side frame of the vehicle, wherein the first and second locking plates are respectively disposed at or near a front and a back of a transverse frame of the vehicle;
   at least four frame fastening sleeves, wherein two of the frame fastening sleeves are installed at or near a top of the side frame of the vehicle, wherein another two of the frame fastening sleeves are installed at or near a bottom of the side frame of the vehicle;

wherein, in installation, the frame fastening sleeves are used as an abutment between the protruding flanges of the frame locking bracket and the first and second frame locking plates, wherein locking bolts are disposed through holes of the frame locking bracket, the frame locking sleeves and the first and second frame locking plates;

wherein spot nuts are used to tighten connections, formed by the locking bolts, the frame locking bracket, the frame locking sleeves, and the first and second frame locking plates, on both the top and the bottom of the side frame of the vehicle;

wherein a filling receptacle cover is disposed on the gas filling receptacle and the fuel pipe unit by locking the filling receptacle cover to an edge of a hole of a vehicle body.

2. The CNG filling receptacle holding device as claimed in claim 1, wherein:

the frame bracket is a mounting frame for a gas filling receptacles, the upper gas filling receptacle holding bracket is an upper mounting board of filling receptacles, the lower gas filling receptacle holding bracket is a lower mounting board of filling receptacles, the frame locking bracket is a plate mounted to the frame, the frame fastening sleeves form at least one screw case, the first and second frame locking plates are boards for locking the gas filling receptacles to the frame, the fuel pipe covering bracket is a first cover of a fuel filling pipe, and the filling receptacle cover covers the gas filling receptacle and a fuel filling receptacle of the vehicle.

* * * * *